Patented Oct. 31, 1950

2,527,645

UNITED STATES PATENT OFFICE 2,527,645

DEHYDROCHLORINATION OF ALPHA-CHLORISOBUTYRATES

Max B. Mueller, Dumont, and Erhard J. Prill, Cresskill, N. J., assignors to Allied Chemical & Dye Corporation, New York, N. Y., a corporation of New York No Drawing. Application July 29, 1948, Serial No. 41,394

5 Claims. (Cl. 260—486)

This invention relates to production of methacrylates, more particularly to production of methyl methacrylate by dehydrochlorination of methyl alpha-chlorisobutyrate in liquid phase.

It has been disclosed in the art that methyl alpha-chlorisobutyrate may be dehydrochlorinated in liquid phase using a zinc halide catalyst.

It is an object of the present invention to provide a novel catalyst containing anhydrous zinc chloride for the liquid phase dehydrochlorination of alpha-chlorisobutyrates to methacrylates, which catalyst promotes more rapid reaction and higher yields than the known zinc chloride catalyst. Other objects and advantages will appear hereinafter.

We have now found that when dialkyl phthalats are employed in conjunction with anhydrous zinc chloride as catalyst in the liquid phase dehydrochlorination of alpha-chlorisobutyrates to methacrylates the yield of methacrylate is greatly improved over that obtained similarly by using anhydrous zinc chloride alone, and the reaction takes place more rapidly.

The dialkyl phthalates appear to form complexes with anhydrous zinc chloride. For example, a solid product is obtained on heating a mixture of dimethyl phthalate and anhydrous zinc chloride and then cooling to room temperatures. The favorable effect of dialkyl phthalates on catalysis of alpha-chlorisobutyrate dehydrochlorination with zinc chloride may be connected with complex formation but we do not intend to be limited by that theory of the catalysis.

Among suitable dialkyl phthalates those having alkyl groups containing 1-8 carbon atoms may be particularly mentioned. It is not necessary that the two alkyl groups of the dialkyl phthalate be the same. Mixed dialkyl esters of phthalic acid may be used if desired. Suitably, but not necessarily, the ester of phthalic acid employed is that in which both alkyl groups are the same as the alkyl group of the alkyl alpha-chlorisobutyrate which is to be converted to an alkyl methacrylate. Thus for example dimethyl phthalate is a very suitable dialkyl phthalate to employ in the dehydrochlorination of methyl alpha-chlorisobutyrate to methyl methacrylate.

The following is an example illustrative of the process of our invention, but is not intended to limit the scope of the invention.

Example.—A mixture of 63 grams of methyl alpha-chlorisobutyrate, 20 grams of freshly fused anhydrous zinc chloride, a small amount of hydroquinone, and 100 grams of dimethyl phthalate was heated under reflux until the reaction was substantially completed (about 1 hour) while a methyl methacrylate fraction containing hydrogen chloride and boiling 82°–92° C. was removed through a fractionating column as the reaction proceeded. The pot temperature rose during the heating period from about 145° C. at the start to about 175° C. when the reaction was substantially over. The distillate was extracted with ether and the ether extract washed with water and dilute sodium carbonate solution. The product was dried over anhydrous calcium sulfate drying agent and fractionated in the presence of a little hydroquinone as polymerization inhibitor. About 35.6 grams (77.5 mol percent of theory) of methyl methacrylate boiling 100°–105° C. was obtained.

When dibutyl phthalate was substituted for dimethyl phthalate in the procedure of this example, the time for substantial cessation of reaction was reduced to about 0.5 hour.

An experiment carried out in the same manner but without the addition of a phthalate required 1.5 hours for substantial cessation of the reaction. The yield of methyl methacrylate boiling 92°–105° C. was 55% of theory as compared to the 77.5% yield above.

According to a preferred form of our process the reaction temperatures are those under which the methacrylate product fractionally distills out of the reaction mixture while other components are returned to the mixture by reflux condensation. For example when methyl methacrylate is being formed, the reaction temperatures will be above the boiling points at atmospheric pressure of methyl methacrylate fractions (which may boil as the reaction proceeds from about 80° to about 105° C.); but reaction temperatures normally will not exceed the boiling point at atmospheric pressure of dimethyl phthalate (282° C.).

The time required for substantial cessation of the reaction will depend on the reaction temperatures employed. The reaction is usually run so as to separate the desired methacrylate continuously by fractionation and is virtually over when the boiling point of the distillate being taken off rises above the range for said methacrylate; i. e., when the distillate contains substantially solely compounds higher boiling than the desired methacrylate.

The proportions of anhydrous zinc chloride and dialkyl phthalate may vary within wide limits. From about 0.1 to about 40.0% of zinc chloride and from about 0.1 to about 400.% of dialkyl phthalate may be utilized, based on the weight of the alpha-chlorisobutyrate taken as starting material. The number of mols of dialkyl phthalate taken suitably is at least about equal to the number of mols of zinc chloride taken.

We claim:

1. In the catalytic liquid phase dehydrochlorination of an alpha-chlorisobutyrate with anhydrous zinc chloride catalyst the improvement which comprises adding a dialkyl phthalate having alkyl groups containing 1–8 carbon atoms to the reaction mixture containing the alpha-chlorisobutyrate and anhydrous zinc chloride.

2. A process in accordance with claim 1 in which both alkyl groups of the dialkyl phthalate are the same as the alkyl group of the alkyl alpha-chlorisobutyrate which is to be converted to an alkyl methacrylate.

3. The process for the production of a methacrylate by dehydrochlorination of an alpha-chlorisobutyrate which comprises heating said alpha-chlorisobutyrate in the liquid phase with anhydrous zinc chloride and with a dialkyl phthalate having alkyl groups containing 1–8 carbon atoms, at temperatures at which the methacrylate product fractionally distills out of the reaction mixture while other components of the reaction mixture are returned thereto by reflux condensation.

4. A process in accordance with claim 3 in which the amount of zinc chloride is from about 0.1 to about 40.0 weight percent and the amount of dialkyl phthalate is from about 0.1 to about 400.0 weight percent, based on the weight of the alpha-chlorisobutyrate taken as starting material.

5. A process in accordance with claim 4 in which the alpha-chlorisobutyrate is methyl alpha-chlorisobutyrate and the dialkyl phthalate is dimethyl phthalate.

MAX B. MUELLER.
ERHARD J. PRILL.

No references cited.